United States Patent
Kim et al.

(10) Patent No.: US 10,829,108 B2
(45) Date of Patent: Nov. 10, 2020

(54) HYBRID ELECTRIC VEHICLE AND METHOD OF CONTROLLING ENGINE OPERATION FOR THE SAME

(71) Applicants: HYUNDAI MOTOR COMPANY, Seoul (KR); KIA MOTORS CORPORATION, Seoul (KR)

(72) Inventors: Sang Joon Kim, Seoul (KR); Lee Hyoung Cho, Suwon-si (KR); Young Chul Kim, Seongnam-si (KR); Jea Mun Lee, Seoul (KR); Dong Ho Yang, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 324 days.

(21) Appl. No.: 15/849,512

(22) Filed: Dec. 20, 2017

(65) Prior Publication Data
US 2019/0126910 A1 May 2, 2019

(30) Foreign Application Priority Data
Nov. 1, 2017 (KR) .................. 10-2017-0144709

(51) Int. Cl.
*B60W 20/40* (2016.01)
*B60W 10/06* (2006.01)
(Continued)

(52) U.S. Cl.
CPC .............. *B60W 20/40* (2013.01); *B60K 6/48* (2013.01); *B60W 10/06* (2013.01); *B60W 10/08* (2013.01);
(Continued)

(58) Field of Classification Search
CPC ...... B60W 20/40; B60W 20/16; B60W 10/08; B60W 10/06; B60W 2540/103;
(Continued)

(56) References Cited

U.S. PATENT DOCUMENTS 8,392,091 B2  3/2013  Hebbale et al.
9,764,632 B2 *  9/2017  Yu .......................... B60K 6/445
(Continued)

FOREIGN PATENT DOCUMENTS

DE   102011113714 A1   3/2013
JP   2005-256820 A    9/2005
(Continued)

OTHER PUBLICATIONS

Machine Translation of DE102011113714 retrieved from espacenet on Jan. 5, 2020 (Year: 2020).*
(Continued)

*Primary Examiner* — Thomas Ingram
(74) *Attorney, Agent, or Firm* — McDonnell Boehnen Hulbert & Berghoff LLP

(57) ABSTRACT

Disclosed are a hybrid electric vehicle, which is capable of controlling engine starting in consideration of entry into a specific area, and method of controlling the same. A method of controlling engine starting of a hybrid vehicle includes determining whether catalyst heating is necessary, determining whether a current location corresponds to a specific area associated with exhaust emissions, determining whether a first mode driving is possible, when it is determined that the current position corresponds to the specific area and the catalyst heating is necessary, and performing the first mode driving when the first mode driving is determined to be possible, or a second mode driving when the first mode driving is determined to be impossible. Here, the first mode driving is performed by using an electric motor, and the
(Continued)

second mode driving is performed by using at least an engine.

18 Claims, 4 Drawing Sheets

(51) Int. Cl.
*B60W 10/08* (2006.01)
*F02N 11/00* (2006.01)
*B60K 6/48* (2007.10)
*G01C 21/34* (2006.01)
*F01N 9/00* (2006.01)
*B60W 20/16* (2016.01)

(52) U.S. Cl.
CPC .............. *B60W 20/16* (2016.01); *F01N 9/00* (2013.01); *F02N 11/00* (2013.01); *G01C 21/3461* (2013.01); B60W 2510/0676 (2013.01); B60W 2510/087 (2013.01); B60W 2510/244 (2013.01); B60W 2510/246 (2013.01); B60W 2530/12 (2013.01); B60W 2540/103 (2013.01); B60W 2552/15 (2020.02); B60W 2556/50 (2020.02); B60W 2710/06 (2013.01); B60W 2710/08 (2013.01); F01N 2590/11 (2013.01); F01N 2900/104 (2013.01); F01N 2900/12 (2013.01); F01N 2900/1404 (2013.01); F01N 2900/1602 (2013.01); F01N 2900/1626 (2013.01); Y10S 903/93 (2013.01)

(58) Field of Classification Search
CPC ....... B60W 2530/12; B60W 2510/246; B60W 2550/142; B60W 2510/0676; B60W 2710/08; B60W 2710/06; B60W 2510/244; B60W 2510/087; B60W 2550/402; F01N 9/00; F01N 2900/1626; F01N 2900/1602; F01N 2900/12; F01N 2590/11; F01N 2900/104; F01N 2900/1404; G01C 21/3461; F02N 11/00; F02N 11/0837; F02N 2200/061; F02N 2200/026; F02N 2200/124; F02N 2200/123; F02N 11/0803
See application file for complete search history.

(56) References Cited

U.S. PATENT DOCUMENTS

| | | | |
|---|---|---|---|
| 2003/0078707 A1* | 4/2003 | Shioda | B60K 6/48 701/22 |
| 2010/0274422 A1* | 10/2010 | Schrey | G01C 21/3461 701/22 |
| 2016/0047323 A1* | 2/2016 | Suzuki | F02P 5/1502 60/285 |
| 2016/0193992 A1* | 7/2016 | Hancock | B60K 6/48 701/22 |
| 2016/0280213 A1* | 9/2016 | Lian | B60K 6/48 |
| 2016/0325744 A1* | 11/2016 | Yang | B60W 10/06 |
| 2017/0066429 A1* | 3/2017 | Ogawa | B60L 58/13 |
| 2017/0130635 A1* | 5/2017 | Smith | F01N 9/00 |
| 2017/0131635 A1 | 5/2017 | Smith et al. | |
| 2017/0320482 A1* | 11/2017 | Leone | B60W 20/13 |
| 2018/0170349 A1* | 6/2018 | Jobson | B60L 7/18 |

FOREIGN PATENT DOCUMENTS

| | | |
|---|---|---|
| JP | 2011-174393 A | 9/2011 |
| JP | 2013-56614 A | 3/2013 |
| WO | 2011/160995 A1 | 12/2011 |
| WO | 2016/202360 A1 | 6/2015 |

OTHER PUBLICATIONS

Extended European Search Report of corresponding Patent Application No. 17209910.3—7 pages (dated Aug. 1, 2018).

* cited by examiner

US 10,829,108 B2

HYBRID ELECTRIC VEHICLE AND METHOD OF CONTROLLING ENGINE OPERATION FOR THE SAME

CROSS-REFERENCE TO RELATED APPLICATION

This application claims the benefit of Korean Patent Application No. 10-2017-0144709, filed on Nov. 1, 2017, which is hereby incorporated by reference as if fully set forth herein.

BACKGROUND

Technical Field

The present disclosure relates to a hybrid electric vehicle and a method of controlling engine operation for the same, and more particularly, to a hybrid vehicle and a control method thereof capable of controlling engine starting in consideration of entry into a specific area.

Discussion of Related Art

In general, a hybrid electric vehicle (HEV) refers to a vehicle using two kinds of power sources and the two kinds of power sources are mainly an engine (e.g., an internal combustion engine) and an electric motor. Such a hybrid electric vehicle not only has excellent fuel efficiency and power performance but also effectively reduces exhaust gas, as compared to a vehicle including only an internal combustion engine.

Such a hybrid electric vehicle may be operated in two driving modes according to kinds of operating powertrains. The two driving modes include an electric vehicle (EV) mode in which the hybrid electric vehicle is driven only using the electric motor and a hybrid electric vehicle (HEV) mode in which power is provided by operating both the electric motor and the engine. The hybrid electric vehicle performs the transition between the two modes according to the driving conditions.

The disclosure of this section is to provide background of the invention. Applicant notes that this section may contain information available before this application. However, by providing this section, Applicant does not admit that any information contained in this section constitutes prior art.

SUMMARY

Accordingly, the present disclosure is directed to a hybrid electric vehicle and a method of controlling the same that substantially obviate one or more problems due to limitations and disadvantages of the related art.

An aspect of the present disclosure is to provide a method capable of performing engine starting in consideration of the surrounding situation and a hybrid vehicle for performing the same.

Another aspect of the present disclosure is to provide a method capable of avoiding engine startup for catalyst heating when the surrounding situation is not suitable for engine starting, and a vehicle for performing the same.

Additional advantages, objects, and features of the disclosure will be set forth in part in the description which follows and in part will become apparent to those having ordinary skill in the art upon examination of the following or may be learned from practice of the teachings disclosed herein. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling engine starting of a hybrid vehicle includes determining whether catalyst heating is necessary, determining whether a current location corresponds to a specific area associated with exhaust emissions, determining whether a first mode driving is possible, when it is determined that the current position corresponds to the specific area and the catalyst heating is necessary, and performing the first mode driving when the first mode driving is determined to be possible, or a second mode driving when the first mode driving is determined to be impossible. Here, the first mode driving is performed by using an electric motor, and the second mode driving is performed by using at least an engine.

In another aspect of the present disclosure, a hybrid electric vehicle includes a catalyst heating determination unit configured to determine whether catalyst heating is necessary, a green zone detection unit configured to determine whether a current position corresponds to a specific area associated with exhaust emissions, and a powertrain control unit configured to determine whether a first mode driving is possible, when it is determined that the current position corresponds to the specific area and the catalyst heating is necessary, and to control the first mode driving to be performed when the first mode driving is determined to be possible, or a second mode driving to be performed when the first mode driving is determined to be impossible, wherein the first mode driving is performed by using an electric motor, and the second mode driving is performed by using at least an engine.

It is to be understood that both of the foregoing general descriptions and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
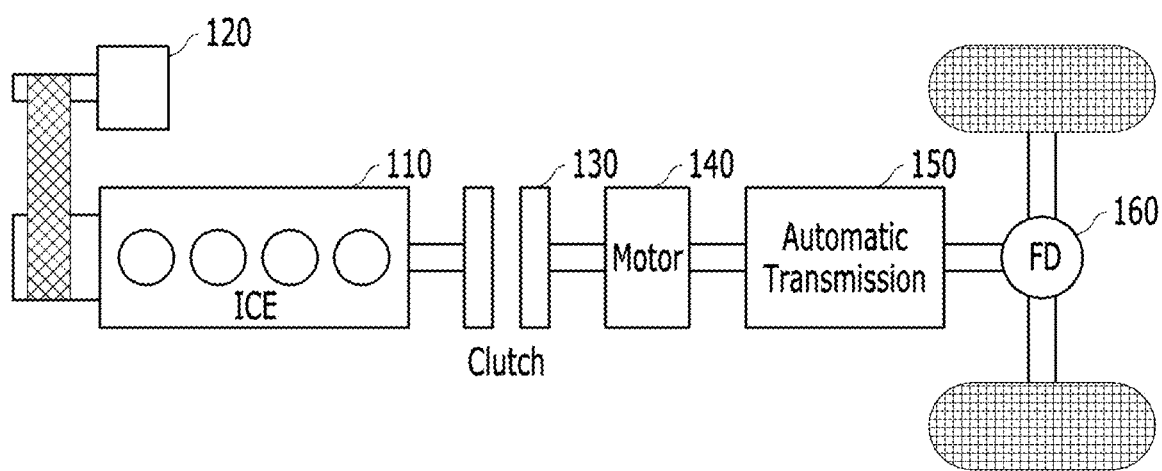
FIG. 1 is a schematic view exemplarily illustrating the structure of a powertrain of a hybrid electric vehicle in accordance with one embodiment of the present disclosure.

In a hybrid vehicle, catalyst heating control is performed in order to reduce exhaust gas at the time of engine startup in a transition to the HEV mode. The catalytic heating control normally uses combustion heat generated during inefficiently controlled engine combustion. When the vehicle is parked for a predetermined time or more, the engine is maintained at a normal temperature. Therefore, when the driver presses the start button, the engine is started for catalyst heating. If the vehicle is parked indoor, especially in a narrow garage, exhaust gas having relatively large pollutant content is discharged until the catalyst for exhaust gas purification is heated, so that the driver feels uncomfortable. Such a situation can be solved by transition to the EV mode, but there is an inconvenience that the driver has to manually input a command for the mode transition to the EV mode.

Further, it is difficult for the driver to recognize whether or not the catalyst is heated in a general hybrid vehicle, and it is cumbersome to manually input the command for the transition to the EV mode whenever the catalyst is heated in an undesired situation.

Reference will now be made in detail to certain embodiments of the present disclosure, examples of which are illustrated in the accompanying drawings. In the drawings, the same or similar elements are denoted by the same reference numerals even though they are depicted in different drawings. The suffixes "module" and "unit" used in the description below are given or used together only in consideration of ease in preparation of the specification and do not have distinctive meanings or functions.

In the following description, a detailed description of known functions and configurations incorporated herein will be omitted when it may make the subject matter of the present disclosure unclear. In addition, the accompanying drawings serve only to easily describe the embodiments disclosed in the specification but do not limit the technical spirit disclosed in the specification, and it will be understood that the embodiments include various modifications, equivalents, and substitutions, without departing from the scope and spirit of the disclosure as disclosed in the accompanying claims.

Forms of the present disclosure propose a method of controlling engine starting according to whether the surrounding environment is an area affected by exhaust gas discharge and a hybrid vehicle for performing the method.

Before explaining the engine starting control method according to the forms of the present disclosure, the structure of the hybrid vehicle, the control system, and the concept of the area affected by the exhaust emissions will be described first.

An aspect of the present invention provides a method for controlling a hybrid electric vehicle to prevent or limit operation of a combustion engine in a specific area associated with exhaust emissions, e.g., inside an indoor garage. A cold start (starting the engine 110 from an atmospheric temperature when the vehicle is parked) or a cold operation (operating the engine when a catalytic converter is cold) is not desirable inside an indoor garage because exhaust gas from the vehicle contains more pollutants compared to operating the engine when the engine is heated.

At least one computing device (controller) of the vehicle controls start/operation of the engine 110. In response to a driver's command to start the vehicle while the vehicle is parked, the controller determines at least one of the following (1) whether a temperature of the engine 110 or a temperature of a catalytic converter is cold (at a temperature lower than a predetermined reference), (2) whether the vehicle is inside an indoor garage using information from at least one sensor installed in the vehicle, (3) whether state of charge (SOC) of a battery for supplying power to the motor 140 is enough for an electric vehicle (EV) mode (driving the vehicle using power from the motor we know operating the engine 110).

When it is determined that the engine or the catalytic converter (catalytic emission control device) is cold, the vehicle is parked an indoor garage, and SOC of the battery is enough for the EV mode, the controller does not start the engine in response to the driver's command to start the vehicle and the vehicle drives without operating the engine 110.

In embodiments, when it is determined that the engine and the catalytic converter is hot enough (at a temperature higher than a predetermined reference), the vehicle starts its engine 110 in response to the command to start vehicle even when the vehicle is inside an indoor garage.

In embodiments, when it is determined that SOC of the battery is lower than a predetermined reference, the vehicle starts its engine 110 in response to the command to start vehicle, even when the engine or the catalytic converter is cold (at a temperature lower than a predetermined reference).

In embodiments, subsequent to starting the vehicle in the EV mode without starting the engine, when it is determined that the vehicle exited the indoor garage, the vehicle starts its engine in an open space outside the garage. In embodiments, subsequent to starting the vehicle in the EV mode without starting the engine, when a target torque corresponding to the driver's input on a pedal is greater than an upper limit of the EV mode, the vehicle starts its engine to supply the target torque even when the vehicle is still inside the indoor garage (indoor parking structure).

With reference to FIG. 1, the structure of a hybrid electric vehicle in accordance with one form of the present disclosure will be described.

FIG. 1 is a schematic view exemplarily illustrating the structure of a powertrain of a hybrid electric vehicle in accordance with one embodiment of the present disclosure.

FIG. 1 illustrates a powertrain of a hybrid electric vehicle employing a parallel-type hybrid system in which an electric motor (or a driving motor) 140 and an engine clutch 130 are disposed between an internal combustion engine (ICE) 110 and an automatic transmission 150.

In general, in such a hybrid electric vehicle, if a driver presses an accelerator pedal after starting of the hybrid electric vehicle, the engine motor 140 is primarily driven using power of a main battery (not shown) in the open state of the engine clutch 130, and wheels are moved by power of the electric motor 140 via the transmission 150 and a final drive 160 (FD) (i.e., in the EV mode). When the hybrid electric vehicle is gradually accelerated, gradual increase in driving force is required and thus a starter generator motor 120 is operated to drive the engine 110.

Thereby, when rotating speeds of the engine 110 and the electric motor 140 become equal, the engine clutch 130 is closed and thus the hybrid electric vehicle is driven by both the engine 110 and the electric motor 140 (i.e., transition from the EV mode to the HEV mode). When predetermined engine stall conditions, such as deceleration of the hybrid electric vehicle, are satisfied, the engine clutch 130 is opened and the engine 110 is stopped (i.e., transition from the HEV mode to the EV mode). Here, the electric motor 140 charges the main battery using the driving force of the wheels and such a process is referred to as braking energy regeneration or regenerative braking. Additionally, the starter generator motor 120 serves as a starter motor when the engine is started, and serves as a generator during recovery of rotational energy of the engine 110 after the engine 110 is started or when the engine 110 is turned off, thus being referred to as a hybrid starter generator (HSG).

Figure 2:
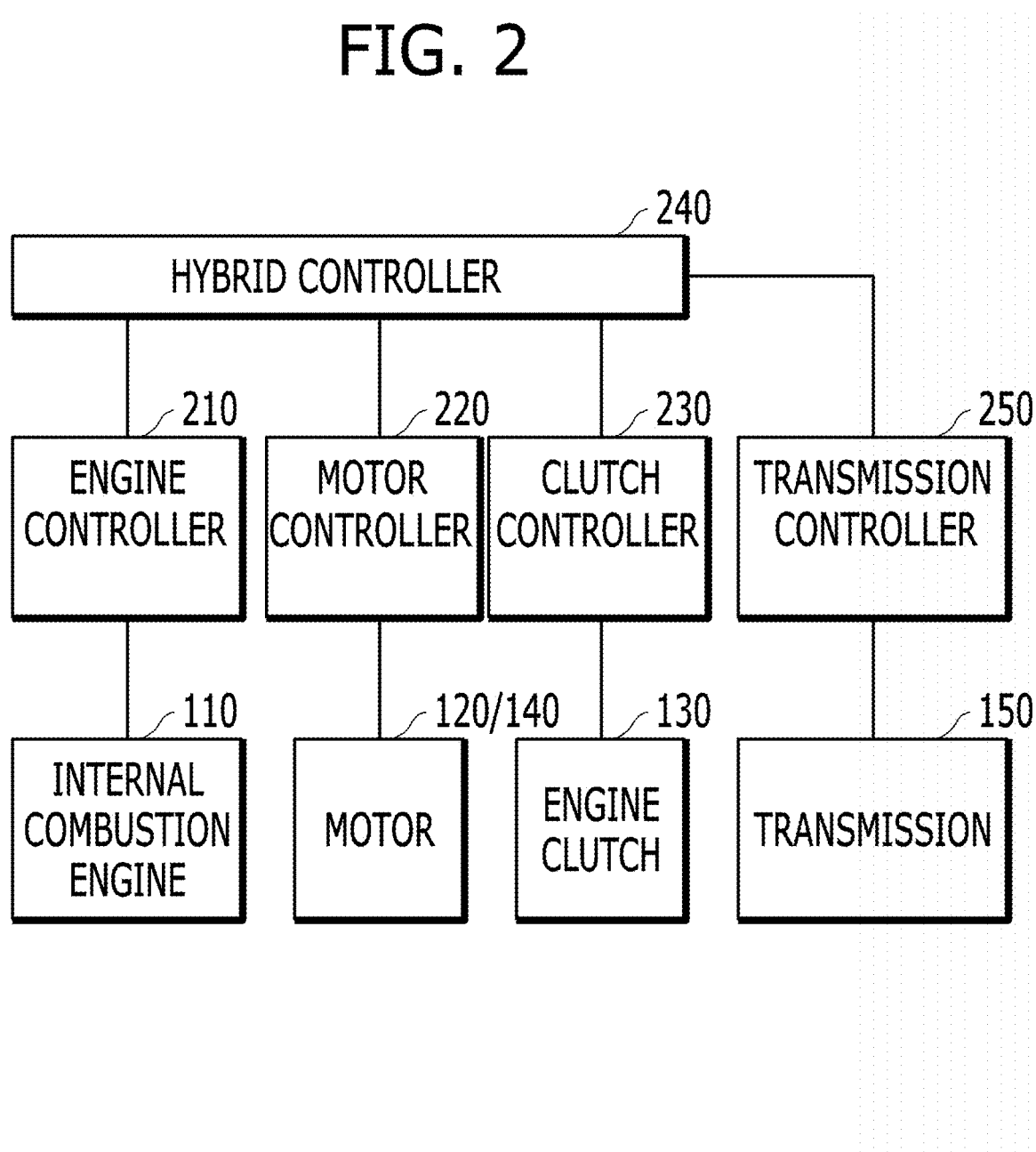
FIG. 2 is a block diagram exemplarily illustrating a control system of the hybrid electric vehicle in accordance with one embodiment of the present disclosure.

Relations between controllers or control units in a hybrid electric vehicle, to which the above-described powertrain is applied, will be shown in FIG. 2.

FIG. 2 is a block diagram exemplarily illustrating a control system of the hybrid electric vehicle in accordance with one embodiment of the present disclosure.

With reference to FIG. 2, in the hybrid electric vehicle in accordance with one embodiment of the present disclosure, an engine controller 210 may control the operation of the internal combustion engine 110, a motor controller (MCU) 220 may control the operation of the starter generator motor 120 and the electric motor 140, and a clutch controller 230 may control the operation of the engine clutch 130. Here, the engine controller 210 may be referred to as an engine management system (EMS). Further, a transmission controller 250 may control operation of the transmission 150. According to some embodiments, the starter generator motor 120 and the electric motor 140 may be separately controlled by different motor controllers.

The above-described respective controllers 210, 220, 230 and 250 may be connected to an upper-level controller, i.e., a hybrid controller 240 which executes overall control of the powertrain in the hybrid electric vehicle (hereinafter, referred to as a "hybrid controller" or "hybrid control unit (HCU)"). The respective controllers 210, 220, 230 and 250 may provide to the hybrid controller 240 with information necessary for driving mode switching, information necessary for control of the engine clutch 130 during gear shifting, and/or information necessary for control of stoppage of the engine 110. The respective controllers 210, 220, 230 and 250 may additionally or alternatively execute operation according to a control signal under the control of the hybrid controller 240.

In more detail, the hybrid controller 240 determines whether or not mode switching is executed according to the driving state of the hybrid electric vehicle. For example, the hybrid controller 240 determines an opening time of the engine clutch 130, and controls a hydraulic pressure (in the case of a wet EC) or controls torque capacity (in the case of a dry EC) when the engine clutch 130 is opened. Further, the hybrid controller 240 may determine the state (e.g., the lock-up, the slip state, the open state, or the lock-up stuck state) of the engine clutch 130 through the clutch controller 230, control the cut-off time of fuel injection of the engine 110, and control the sub-controllers (or lower level controllers, e.g., 210, 220, 230 and 250) for determining and performing the mode transition condition at the time of the mode transition control according to the embodiments of the present disclosure to be described later.

Of course, it is apparent to those skilled in the art that the connection relations between the above-described controllers and the functions/divisions of the respective controllers are exemplary and the names of the respective controllers are not limited thereto. For example, any one of the controllers other than the hybrid controller 240 may provide the functions of the hybrid controller 240, or two or more of the other controllers may divisionally provide the functions of the hybrid controller 240 in the distributed manner.

Next, the concept of the area affected by exhaust emissions is explained.

Such an area may be a predetermined area or may be variably set according to current/recent circumstances.

Here, the predetermined area may include an area set by a regulatory or governmental policies (for example, off-gas management area, such as London and Seoul) and the region where reduced exhaust emissions by the local characteristics (e.g., Children protection Area, indoor parking, residential area, park, drive-through, hospital, etc.).

Further, the area variably set may include an area that can be checked over the wireless information such as the Telematics service, and a pedestrian-crowded area determined through a vision information acquiring device (ADAS system or the like) provided in the vehicle, and the like. For example, an area where the atmospheric condition deteriorates is detected via the atmospheric environment information, an area where is crowded with pedestrians is detected based on the Big Data using the location information of the smartphone, and an area where a large amount of exhaust emissions is expected based on traffic information may correspond to the area variably set.

In addition, the area affected by the exhaust emissions may be set as a unit of an arbitrary administrative zone, a zone defined by connecting a plurality of coordinates as a boundary point, a zone corresponding to a specific facility itself or a part thereof, or a zone within a certain radius distance from a coordinates or a specific facility. Of course, the above-described setting examples are illustrative, and the embodiments of the present invention are not limited by setting criteria of this region, setting range, setting period, and the like.

In the following description, the area affected by exhaust emissions is referred to as "Green Zone", for convenience.

In one form of the present disclosure, a hybrid vehicle and an engine control method by suppressing engine startup when the surrounding environment is determined to be an area affected by the exhaust emissions, when a catalyst heating is required.

To this end, the engine starting control method according to this form includes a process of determining whether the location of the vehicle is a green zone, a process of determining whether or not catalyst heating is necessary, and a process of determining whether to start engine based on the determined location and the necessity of the catalyst heating.

A schematic configuration in which the above-described processes are performed and a device configuration therefor will be described with reference to FIG. 3.

Figure 3:
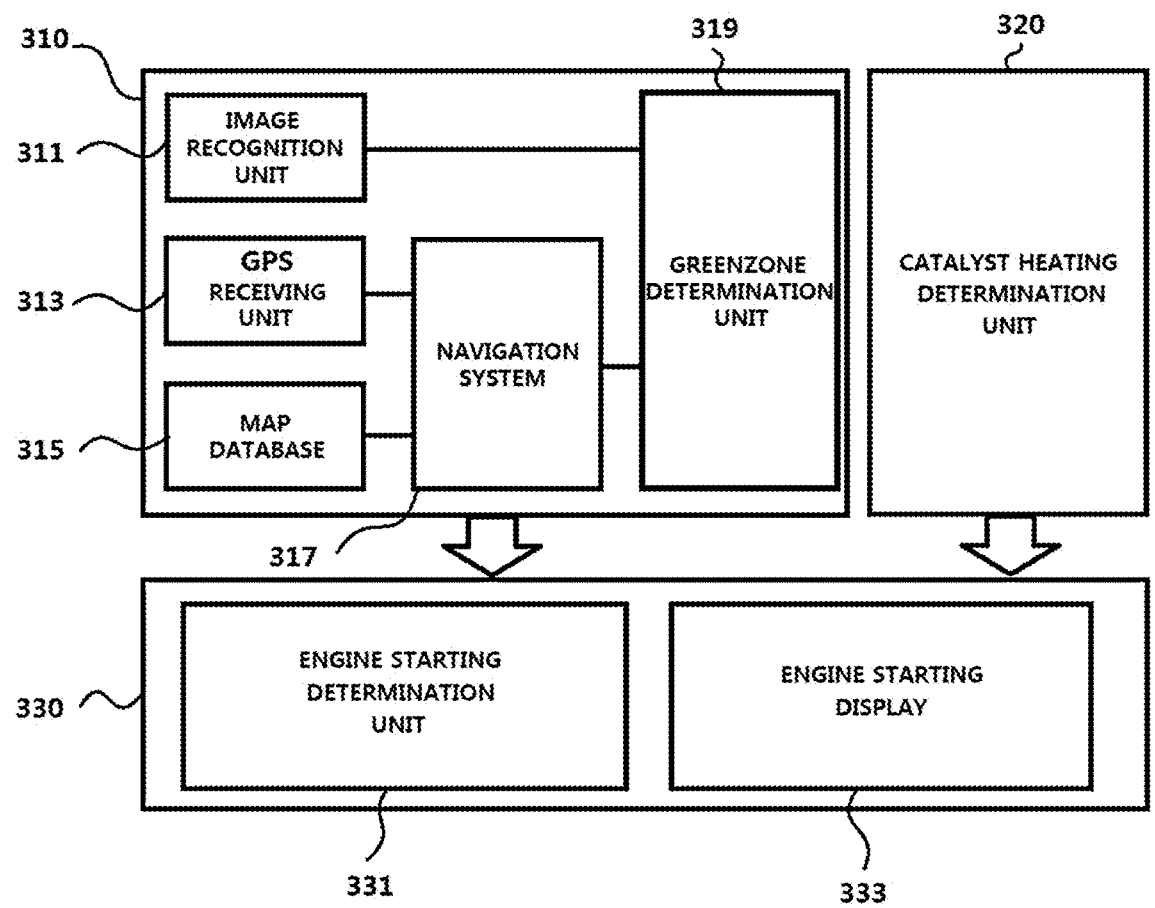
FIG. 3 is a block diagram exemplarily illustrating a hybrid electric vehicle for performing engine starting control in accordance with one embodiment of the present disclosure.

FIG. 3 is a block diagram illustrating an example of a hybrid vehicle structure for performing engine starting control according to one form of the present disclosure.

Referring to FIG. 3, the hybrid vehicle according to the present embodiment may comprise a green zone detection unit 310 configured to detect whether the vehicle is (or will be) in a green zone, a catalyst heating determination unit 320 configured to determine whether or not catalyst heating is necessary, and a power train control unit 330 configured to determine whether to start the engine depending on the necessity of heating and the result of the green zone detection.

The configuration and function of each part will be described in detail below.

First, the green zone detection unit 310 may include an image recognition unit 311 configured to perform image recognition, a GPS receiving unit 313 configured to acquire information on the current position, a map database 315 configured to store map information, a navigation system 317, and a green zone determination unit 319.

The image recognition unit 311 includes at least one image acquisition device such as a camera, and can obtain images around the vehicle. The image recognition unit 311 can be determine whether or not the current position is a position corresponding to a green zone such as an indoor or outdoor, a parking lot, a park, a drive through, a hospital, etc.

based on the obtained images through processes such as feature point extraction, sign recognition, etc.

The GPS receiving unit 313 may include at least one GPS module to acquire information on the current position of the vehicle, and may transmit the information to the navigation system.

The map database 315 stores map information such as a type of road, an inclination, a distance, and a green zone setting information.

The navigation system 317 may apply the position information received from the GPS receiver 313 to the map information of the map database 315 to determine whether the current position corresponds to the green zone set in the map information.

The green zone determination unit 319 can finally determine whether the current position corresponds to the green zone by combining the information acquired by the image recognition unit 311 and the navigation system 317.

According to one aspect of the present form, the image recognition unit 311 may use an image acquisition device provided in the advanced driving assistant system (ADAS) or may be implemented in a form included in the ADAS.

In addition, according to one aspect of the present form, the navigation system 317 can be implemented in the form of an AVN (Audio/Video/Navigation) system.

In addition, according to one aspect of the present form, the green zone determination unit 319 may be implemented by a controller separate from the AVN system, or may be implemented in a form included in the AVN system.

According to one aspect of the present form, in case where the recognition result of the image recognition unit 311 is different from the determination result of the navigation system 317 in the final green zone determination, the green zone determination unit 319 may apply different weight to each of the results. Or, the green zone determination unit 319 may determines may determine that the current position is the green zone only when the recognition result the image recognition unit 311 is the same as the determination result of the navigation system 317.

According to an aspect of the present form, the image recognition unit 311 provides the obtained image or image processing result to the green zone determination unit 319, instead of the determination result on the green zone, so the green zone determination unit 319 can determine whether or not the provides image or the image processing result indicates the green zone. Further, according to an aspect of one form, the driver may directly set the current zone as a green zone through manipulating a predetermined button or the like.

The catalyst heating determination unit 320 may determine whether catalyst heating is necessary. For this purpose, the catalyst heating determination unit 320 may directly use the measured or estimated temperature of the catalyst or the engine. For example, the temperature of the catalyst can be estimated through the engine coolant temperature, the time and load during which the engine was running, the time elapsed since the engine is stopped, and the like. As another example, when a temperature sensor is disposed at the catalyst or in the vicinity of the catalyst is disposed in the engine, the temperature of the catalyst may be obtained through the sensing value of the temperature sensor. Based on the temperature of the catalyst measured (or estimated) as described above, the catalyst heating determination unit 320 can determine whether catalyst heating is required at present.

According to an aspect of the present embodiment, in the implementation, the catalyst heating determination unit 320 may be an engine controller, a hybrid controller, or a separate controller provided for the function.

Next, the power train control unit 330 may include an engine starting determination unit 331 configured to determine whether the engine is started or not and an engine starting display 333 for visually outputting status information related to whether the engine is started or not.

The engine start determination unit 331 determines whether or not the engine starting restriction condition is satisfied and whether or not the EV mode can be traveled according to the determination, and determines whether to give priority to the EV mode driving or to start the engine for catalyst heating.

The engine starting restriction condition may largely include at least one of a system status condition, a driving status condition, and a driver's will condition. Each condition will be described in detail below.

First, the system status condition may include whether or not the engine needs to be started in order to protect the system. For example, when the state of charge (SOC) of the high-voltage battery for driving the electric motor is lower than a predetermined value, the EV mode driving becomes impossible. As another example, if the EV mode driving is performed while the electric motor and/or the high voltage battery is in an overtemperature condition, there is a possibility that additional output restriction may occur or parts may be damaged.

Next, the driving status condition may include whether the inclination of the road is over a certain range. For example, in the case of a steep slope, the required driving power cannot be satisfied only by the electric motor, and the SOC balancing may be problematic due to the sudden consumption of the battery during the continuous driving, which makes the EV mode driving unsuitable.

The driver's will condition may be a condition related to the driver's required torque or required power. For example, when the driver wants rapid acceleration (e.g., APS value that corresponds to a larger power than a maximum power of the electric motor) to avoid a dangerous situation, or if the driver continues driving at a high speed in order to drive in accordance with the traffic flow on the expressway, the EV mode driving is inadequate.

If the EV mode driving is impossible or unsuitable by at least one of the above-described conditions, the engine starting determination unit 331 may determine to start the engine even if the current position corresponds to the green zone. Of course, the engine starting determination unit 331 may start the engine to perform the catalyst heating when the vehicle is out of the green zone or the engine start restriction condition is resolved. In particular, when the engine is started in the green zone, the engine start determination unit 331 may instruct the engine controller (EMS) to quickly assure the operating performance of the catalyst by the catalyst heating control while minimizing engine load via delayed ignition timing.

The engine starting display 333 notifies the driver that the EV mode driving is impossible according to the determination of the engine starting determination unit 331, or notifies the driver that the current position corresponds to the green zone and EV mode driving is performed with priority.

Table 1 below shows the operation of the power train control unit 330 described above.

TABLE 1

| Green Zone determination | Vehicle condition | Control intervention | | Control Performed |
|---|---|---|---|---|
| | | EV mode priority Control | Powertrain | Displayed Content |
| Not in Green Zone | N/A | N/A | EV/HEV transition control for fuel economy and demand power satisfaction | N/A |
| In Green Zone | Low SOC & High Power Required | N/A | HEV mode control | EV mode priority Not engaged |
| In Green Zone | Normal SOC & Required Power lower than maximum power | Control On | EV mode control | EV mode priority engaged |

According to one form of the disclosure, the engine starting determination unit 331 may be a hybrid controller. In addition, according to one form of the present disclosure, the engine starting display 333 may be a cluster or a display of an AVN system.

Further, although not shown, in a case where the engine starting determination unit 331 is not a hybrid controller, the powertrain control unit 330 may further include a hybrid controller.

Hereinafter, the engine starting control performed in the green zone described above will be described in the form of a flowchart with reference to FIG. 4.

Figure 4:
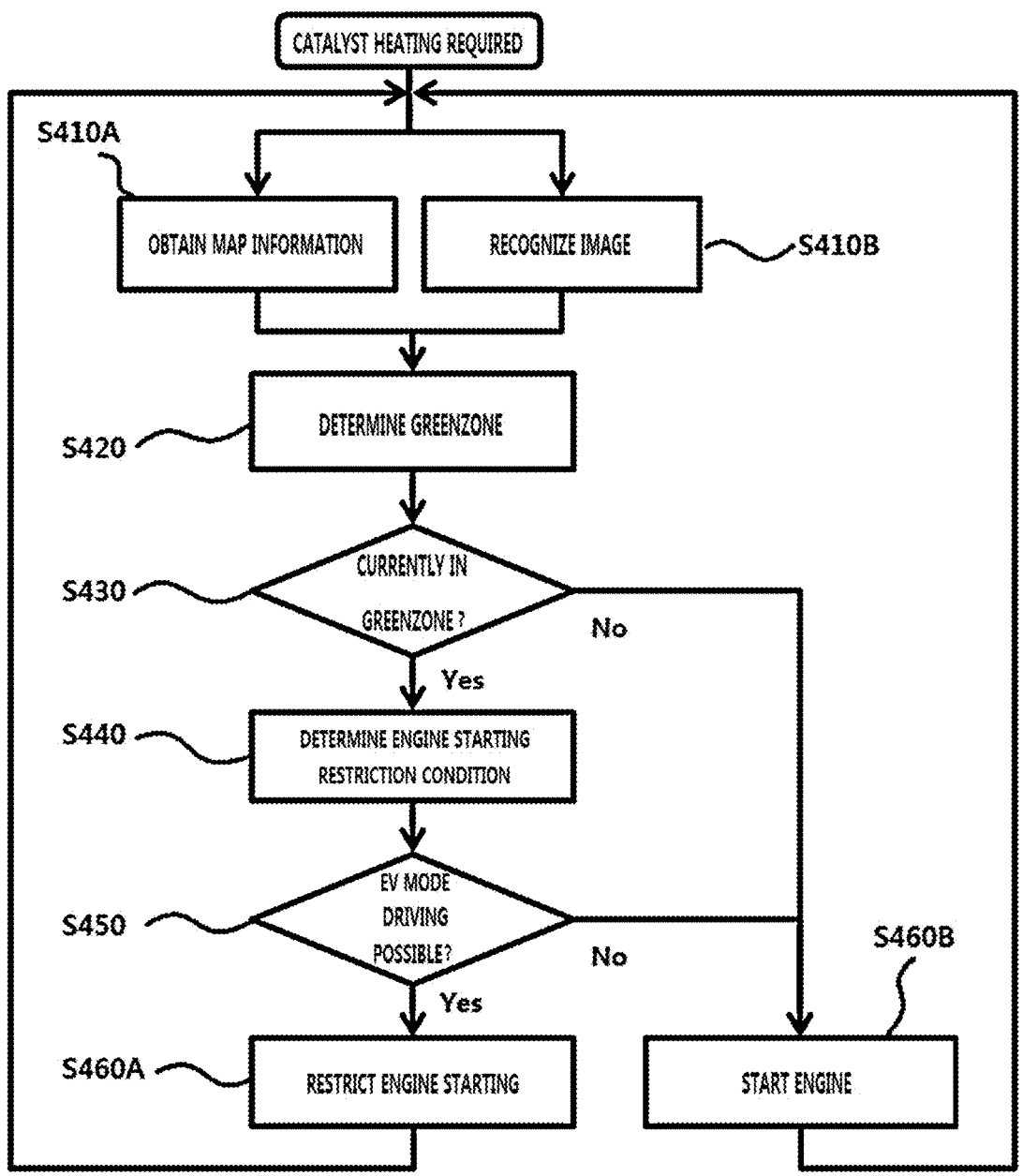
FIG. 4 is a flowchart exemplarily illustrating a process of engine stating control in accordance with one embodiment of the present disclosure.

FIG. 4 is a flowchart exemplarily illustrating a process of engine stating control in accordance with one embodiment of the present disclosure.

Referring to FIG. 4, when it is determined that catalyst heating is necessary (e.g., at the initial startup or when the conditions for transition from the EV mode to the HEV mode are satisfied but catalyst is not heated), map information is obtained (S410A) and image recognition is performed (S410B). Here, as described above, obtaining the map information may be performed in the navigation system 317, and the image recognition may be performed in the image recognition unit 311.

It is determined whether or not the current position corresponds to the green zone through a determination result using the map information and image recognition result (S420). If it is determined that the current position corresponds to the green zone (yes of S430), the engine starting restriction condition may be determined. The determination of whether or not the current position corresponds to the green zone and the engine starting restriction conditions are as described above with reference to FIG. 3, so that redundant description will be omitted for the sake of simplicity of the description.

As a result of the determination of the engine starting restriction condition, it is determined whether or not the EV mode driving is possible (S450). If the EV mode driving is possible, the engine operation is restricted and the EV mode driving can be performed with priority (S460A). On the contrary, if the EV mode driving is impossible, catalyst heating may be performed by starting the engine (S460B). Here, the information corresponding to the EV mode driving possibility can be displayed on the engine starting display 333.

In FIG. 4, whether or not the current position corresponds to the green zone is determined when catalyst heating is required. However, the present disclosure is not limited thereto and condition or time point for determining whether or not the current position corresponds to the green zone may be variously set. For example, if the current position corresponds to the green zone, it may be determined whether or not the catalyst heating is required. Also, whether or not the green zone exists and whether or not the catalyst heating is required may be performed in parallel regardless of a relative order.

The various embodiments disclosed herein, including embodiments of the respective controllers 210-250 described herein, can be implemented using one or more processors coupled to a memory (or other non-transitory machine readable recording medium) storing computer-executable instructions for causing the processor(s) to perform the functions described above including the functions described in relation to the hybrid controller 240, engine controller 210, motor controller 220, clutch controller 230, and transmission controller 250. The processor(s) and memory may be mounted in the hybrid electric vehicle (HEV), and may be communicatively connected to the internal combustion engine 110, motor 120/140, engine clutch 130, and/or transmission 150 as well as to other one(s) of the controllers 210-250 so as to control operation of the vehicle and components thereof as described herein.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The above-described method in accordance with the present disclosure may be implemented as computer readable code stored in a computer readable recording medium. Computer readable recording media include all kinds of computer readable recording devices in which data readable by computers is stored. For example, the computer readable recording media include non-transitory storage media such as a Hard Disk Drive (HDD), a Solid State Drive (SSD), a Silicon Disk Drive (SDD), a ROM, a RAM, a CD-ROM, a magnetic tape, a floppy disk, an optical data storage device, etc. Further, the computer readable recording media may be realized in the form of a carrier wave (for example, transmission over the Internet).

As is apparent from the above description, a hybrid electric vehicle in accordance with at least one embodiment of the present disclosure may perform the engine starting in consideration of the surrounding situation.

Particularly, it is possible to determine whether the route includes a specific area or whether the current location is a specific area, and if so, the engine operation for catalyst heating is performed only in a limited situation, thereby providing a pleasant vehicle environment to the driver.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A method of controlling engine starting of a hybrid vehicle, the method comprises:
    determining whether catalyst heating is necessary using a measured or estimated temperature of an engine;
    determining whether a current location corresponds to a specific area associated with exhaust emissions;
    determining whether a first mode driving is possible, when it is determined that the current position corresponds to the specific area and the catalyst heating is necessary; and
    performing the first mode driving when the first mode driving is determined to be possible, or a second mode driving when the first mode driving is determined to be impossible,
    wherein the first mode driving is performed by using an electric motor,
    wherein the second mode driving is performed by using at least the engine, and
    wherein the step of determining whether a first mode driving is possible comprises:
    determining whether a predetermined engine starting restriction condition is satisfied; and
    determining that the first mode driving is impossible when the engine starting restriction condition is satisfied.

2. The method according to claim 1, wherein the step of determining whether a current location corresponds to a specific area comprises:
    obtaining map information; and
    performing image recognition.

3. The method according to claim 1, wherein the engine starting restriction condition comprises at least a system status condition, a driving status condition, or a driver's will condition.

4. The method according to claim 3, wherein the system status condition comprises at least low state of charge (SoC) of a battery supplying power to the electric motor, overtemperature of the electric motor or overtemperature of the battery.

5. The method according to claim 3, wherein the driving status condition comprises an inclination degree that is equal to or greater than a predetermined level.

6. The method according to claim 3, wherein the driver's will condition comprises a required power based on the accelerator pedal sensor that exceeds a maximum power of the electric motor.

7. The method according to claim 1, when the second mode driving is performed, wherein the method further comprises performing the catalyst heating, and
    wherein the first mode driving comprises an EV mode driving, and the second mode driving comprises an HEV mode driving.

8. The method according to claim 1, wherein the specific area comprises an area where an exhaust emission reduction is forced or recommended.

9. A hybrid electric vehicle, comprising:
    a catalyst heating determination unit configured to determine whether catalyst heating is necessary using a measured or estimated temperature of an engine;
    a green zone detection unit configured to determine whether a current position corresponds to a specific area associated with exhaust emissions; and
    a powertrain control unit configured to:
        determine whether a first mode driving is possible, when it is determined that the current position corresponds to the specific area and the catalyst heating is necessary, and
        control the first mode driving to be performed when the first mode driving is determined to be possible, or a second mode driving to be performed when the first mode driving is determined to be impossible,
    wherein the first mode driving is performed by using an electric motor,
    wherein the second mode driving is performed by using at least the engine, and
    wherein the powertrain control unit is further configured to:
    determine whether a predetermined engine starting restriction condition is satisfied, and
    determine that the first mode driving is impossible when the engine starting restriction condition is satisfied.

10. The hybrid electric vehicle according to claim 9, wherein the green zone detection unit comprises:
    a navigation system configured to obtain map information; and
    an image recognition unit configured to obtain and recognize a peripheral image of the hybrid electric vehicle.

11. The hybrid electric vehicle according to claim 9, wherein the engine starting restriction condition comprises at least a system status condition, a driving status condition, or a driver's will condition.

12. The hybrid electric vehicle according to claim 11, wherein the system status condition comprises at least low state of charge (SoC) of a battery supplying power to the electric motor, overtemperature of the electric motor or overtemperature of the battery.

13. The hybrid electric vehicle according to claim 11, wherein the driving status condition comprises an inclination degree that is equal to or greater than a predetermined level.

14. The hybrid electric vehicle according to claim 11, wherein the driver's will condition comprises a required power based on the accelerator pedal sensor that exceeds a maximum power of the electric motor.

15. The hybrid electric vehicle according to claim 9, when the second mode driving is performed, wherein the powertrain control unit is further configured to control catalyst heating to be performed,
    wherein the first mode driving comprises an EV mode driving, and the second mode driving comprises an HEV mode driving.

16. The hybrid electric vehicle according to claim 9, wherein the specific area comprises an area where an exhaust emission reduction is forced or recommended.

17. The hybrid electric vehicle according to claim 9, wherein the catalyst heating determination unit comprises an engine management system (EMS), and the powertrain control unit comprises an hybrid control unit (HCU).

18. The hybrid electric vehicle according to claim 9, further comprising an engine starting display configured to display visual information corresponding to the first mode driving or the second mode driving under a control of the powertrain control unit.

\* \* \* \* \*

UNITED STATES PATENT AND TRADEMARK OFFICE
CERTIFICATE OF CORRECTION

PATENT NO. : 10,829,108 B2
APPLICATION NO. : 15/849512
DATED : November 10, 2020
INVENTOR(S) : Sang Joon Kim et al.

Page 1 of 1

It is certified that error appears in the above-identified patent and that said Letters Patent is hereby corrected as shown below:

In the Claims

Claim 1, Column 11, Line 9: please replace "location" with --position--

Claim 2, Column 11, Line 30: please replace "location" with --position--

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*